United States Patent
Van Kempen et al.

(10) Patent No.: US 12,247,634 B2
(45) Date of Patent: Mar. 11, 2025

(54) DEVICE FOR MOUNTING A LOAD TO A CARRIER, ASSEMBLY, VEHICLE AND METHODS

(71) Applicant: Nederlandse Organisatie voor toegepast-natuurwetenschappelijk onderzoek TNO, 's-Gravenhage (NL)

(72) Inventors: Floris Clemens Maria Van Kempen, Amsterdam (NL); Jan De Vreugd, Katwijk (NL); William Edward Crowcombe, Ridderkerk (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/917,529

(22) PCT Filed: Apr. 8, 2021

(86) PCT No.: PCT/NL2021/050228
§ 371 (c)(1),
(2) Date: Oct. 6, 2022

(87) PCT Pub. No.: WO2021/206552
PCT Pub. Date: Oct. 14, 2021

(65) Prior Publication Data
US 2023/0133102 A1    May 4, 2023

(30) Foreign Application Priority Data
Apr. 9, 2020    (EP) .................................... 20168961

(51) Int. Cl.
*F16F 15/08*    (2006.01)
*F16M 13/02*    (2006.01)
*B64G 1/22*    (2006.01)

(52) U.S. Cl.
CPC ............ *F16F 15/08* (2013.01); *F16M 13/02* (2013.01); *B64G 1/22* (2013.01); *F16F 2224/025* (2013.01)

(58) Field of Classification Search
CPC .... F16F 15/08; F16F 2224/026; F16M 13/02; B64G 1/22
See application file for complete search history.

(56) References Cited

U.S. PATENT DOCUMENTS

| | | | | |
|---|---|---|---|---|
| 5,102,107 A | * | 4/1992 | Simon | F16F 3/093 267/152 |
| 5,305,981 A | * | 4/1994 | Cunningham | F16F 15/02 248/603 |

(Continued)

FOREIGN PATENT DOCUMENTS

CN    110566630 A    12/2019

OTHER PUBLICATIONS

European Patent Office, International Search Report in corresponding International Application No. PCT/NL2021/050228, dated Jul. 20, 2021 (2 pages).

*Primary Examiner* — Monica E Millner
(74) *Attorney, Agent, or Firm* — Leydig, Voit & Mayer, Ltd.

(57) ABSTRACT

A device for mounting a load to a carrier is described. The device includes a first support configured for fixation to the carrier; a second support configured for fixation to the load. The first and second supports are spaced away from each other viewed along a main load bearing axis of the device. The device further includes an outer shell extending along the main load bearing axis, and an inner member that is within the outer shell. The device includes a damping material connecting the inner member to at least the outer shell, wherein one of the outer shell and the inner member (Continued)

connects the first support and the second support to each other.

20 Claims, 7 Drawing Sheets

(56) References Cited

U.S. PATENT DOCUMENTS

| | | | | |
|---|---|---|---|---|
| 5,971,375 | A * | 10/1999 | Simonian | F16F 15/02 267/136 |
| 6,290,183 | B1 * | 9/2001 | Johnson | B64G 1/641 267/164 |
| 8,240,614 | B2 * | 8/2012 | Camarasa | F16F 15/08 267/136 |
| 9,545,829 | B2 * | 1/2017 | Al-Dahhan | B60G 11/22 |
| 9,880,194 | B2 * | 1/2018 | Witvoet | G01Q 10/04 |
| 10,067,158 | B2 * | 9/2018 | Sadeghian Marnani | G01Q 70/02 |
| 10,125,857 | B2 * | 11/2018 | Kim | F16H 57/025 |
| 10,400,804 | B2 * | 9/2019 | Cheynet De Beaupre | F16B 11/006 |
| 10,570,984 | B1 * | 2/2020 | Shannon | F16F 1/373 |
| 2009/0008504 | A1 | 1/2009 | Camarasa | |
| 2009/0206218 | A1 * | 8/2009 | Massey | F16F 1/324 248/220.21 |
| 2013/0243526 | A1 * | 9/2013 | Williamson | A47L 11/4097 405/271 |
| 2014/0001687 | A1 * | 1/2014 | Braman | F16F 15/08 29/527.1 |
| 2015/0308106 | A1 * | 10/2015 | Hayes | E04H 9/0237 52/167.1 |
| 2017/0002893 | A1 * | 1/2017 | Kim | F16M 11/22 |
| 2018/0072409 | A1 * | 3/2018 | Foskey | B64C 29/0033 |
| 2018/0170614 | A1 * | 6/2018 | Sun | F16F 15/08 |
| 2018/0266461 | A1 | 9/2018 | Cheynet de Beaupre et al. | |
| 2020/0001926 | A1 * | 1/2020 | Berendes | F16F 1/025 |

* cited by examiner

DEVICE FOR MOUNTING A LOAD TO A CARRIER, ASSEMBLY, VEHICLE AND METHODS

CROSS-REFERENCE TO RELATED APPLICATIONS

This patent application is a U.S. National Phase of PCT International Application No. PCT/NL2021/050228, filed Apr. 8, 2021, which claims priority to European Application No. 20168961.9, filed Apr. 9, 2020, which are both expressly incorporated by reference in their entireties, including any references contained therein.

The invention relates to a device and a method for mounting a load to a carrier and a method of producing the device. The invention also relates to an assembly and to a vehicle.

For a load mounted to a carrier, it is often desired to reduce transmission of vibrations from the carrier to the load. For example, a sensitive instrument on board a spacecraft may be subjected to strong vibrations during launch of the spacecraft. Such vibrations can cause damage to the instrument, resulting in reduced functionality and/or reliability of the instrument and possibly in damage to surrounding structures. As another example, in assemblies such as wafer steppers, a sensitive instrument may be subjected to large accelerations at one moment, before requiring precise positioning and orienting the next moment.

While the problem of heavy vibrations itself could be addressed by the use of suitably heavy shock breakers or spring-damper assemblies, this approach is generally not satisfactory, because the sensitive instrument generally requires very precise (re)positioning at least during some period without heavy vibrations. If the instrument would be mounted in a very flexible manner, this would clearly inhibit precise position control. Thus, a combination of protection from heavy vibrations and precise precision control is required in these and other applications. Furthermore, heavy shock breakers would be disadvantageous in spaceflight and other applications due to their large mass.

For example, shock-absorbing assemblies are known from US2009/0008504, CN110566630 and US2018/0266461. Such shock-absorbing assemblies use elastic and/or damping approaches.

US2009/008504 discloses a multi-axis device for isolation of the vibrations generated by vibrating equipment and transmitted to a supporting structure for this equipment. It presents examples that include longitudinal elastomer isolation studs that interconnect equipment supports. Deformations of the studs allow the transmission of low-amplitude vibrations and shocks generated by equipment on the platen to the supporting structure. In order to limit the deformations of the stud, when the supporting structure is subjected to high accelerations (e.g. when a satellite is launched), and, at the same time, to absorb the shocks and vibrations transmitted to the equipment mounted on the platen, the isolation device also comprises flexible buffers.

CN110566630 discloses a launch section vibration attenuation and orbital section vibration isolation integrated load supporting device which can realize the variable stiffness requirements of high stiffness and high damping in a launch section and low stiffness and low damping in an orbit section. An embodiment has a coil spring, that includes a further damper structure with two rubber pads and a piston.

US2018/0266461 discloses a device for shock absorbing attachment of two elements, utilizing tubular outer parts that tubular parts are connected by an intermediate elastomer layer. The elastomer layer, when seen in section in a longitudinal plane includes to either side of an attachment axis, at least three so-called longitudinal portions, and at least two so-called transverse portions.

Besides, a known solution has been published in De Vreugd, Jan, et al. "Damping in space constructions." 13th European Conference on Spacecraft Structures, Materials & Environmental Testing. Vol. 727. 2014. In this solution, an instrument or other load is mounted to a carrier using six solid metal struts, in particular one for each degree of freedom, wherein each strut is provided with a layer of damping material which partially covers the outside of the strut. The layer can be provided with a metal strip on an opposite side of the layer from the strut. During use, in particular under vibratory loads, the damping material is sheared and compressed, wherein kinetic energy is converted to heat, so that part of the vibrations are thereby absorbed. This approach is known as constrained layer damping (opposed to elastic vibration isolation wherein no energy is dissipated).

Such a configuration can provide precise precision control, in particular due to the solid struts. While such a configuration can also provide improved damping of vibrations compared to alternatives such as naked struts, there remains a need for further improvement. In particular better damping of vibrations in combination with precise positioning is desired.

Moreover, a disadvantage of the known solution is that the damping material is exposed to the environment, resulting in a risk of material, e.g. fragments, particular and/or molecular matter, being separated from the strut in the form of debris and/or contamination and causing damage, e.g. to an instrument and/or a respective carrier such as a vehicle.

Load transportation in general, and spaceflight in particular, requires reliable and durable mounting solutions with a small mass and preferably a small number of parts.

Thus, there is a need for an improved method of mounting a load to a carrier.

An object of the present invention is to provide an improved device and method for mounting a load to a carrier, in particular for transporting an instrument, e.g. an optomechanical instrument. An object is to provide such a device and method wherein heavy vibrations are better inhibited from affecting the load while still allowing precise positioning of the mounted load. An object is to provide such a device which is more reliable, more durable and relatively light-weight, and compact. An object is to reduce a risk of debris and/or contamination. An object is to at least partially solve at least one of the above-mentioned problems.

To this end, an aspect of the invention provides a device for mounting a load to a carrier. The device comprises a first support configured for fixation to the carrier and a second support configured for fixation to the load. The first and second supports are spaced away from each other viewed along a main load bearing axis of the device. The device comprises an outer shell extending along the main load bearing axis. The device comprises an inner member, preferably extending along the main load bearing axis, within the outer shell. A damping material connects the inner member to at least the outer shell, preferably at least directly and/or optionally via one or both of the first support and the second support. One of the outer shell and the inner member, preferably the outer shell, connects the first support and the second support (directly) to each other, in particular to provide a direct load path between the supports.

The damping material is preferably a viscoelastic material and/or another material which is suitable for converting received mechanical forces, in particular oscillatory forces, to heat, thus for dissipating kinetic energy.

It has been found that such a device can provide improved damping of vibrations in combination with good position control of the load via the device, in particular when a plurality of such devices is used. Without wishing to be bound by theory, it is believed that the damping material is thus substantially constrained between the outer shell and the inner member (the damping material e.g. being a constrained layer) for converting vibration energy to heat via vibratory shear forces on the damping material, thereby dissipating the kinetic vibration energy. Meanwhile, for precise positioning, the outer shell or the inner member, whichever connects the first support and the second support to each other, can provide a direct load path between the load and the carrier. Said direct load path can thus have a relatively high stiffness, in particular in the absence of vibrations, resulting in the positioning being less affected by creep and/or hysteresis. Also, a substantially vibration dependent stiffness can thus advantageously be provided, with, in the absence of vibrations, a relatively high stiffness. The outer shell, in particular when it connects the first support and the second support to each other, can also protect the damping material from the environment and vice versa, thus reducing a risk of damage associated with debris and/or contamination.

The damping material preferably connects to an inner surface of the outer shell, and preferably also to an outer surface of the inner member (the damping material e.g. covering at least part of the outer surface of the inner member), wherein the damping material preferably connects continuously to each of the inner surface of the outer shell and the outer surface of the inner member.

This can enable a good transfer of vibrations to the damping material and transfer of heat from the damping material to the environment for efficient dissipation of energy.

The outer shell and the inner member may be arranged substantially in parallel (for example providing opposite parallel surfaces that are connected by the damping material). Preferably, the outer shell and the inner member are arranged in parallel with and/or concentric with respect to the main load bearing axis.

In this way, the device can operate well under axial loads.

Similarly, the damping material (e.g. damping layer) as such preferably extends in parallel with the main load bearing axis.

When the outer shell connects the first support and the second support to each other, the inner member may be spaced away from one of the first support and the second support, wherein the inner member is fixed, in particular directly, to the other of the first support and the second support.

Such a configuration can provide efficient and effective absorption of vibrations in the damping material.

The damping material may be spaced away from one of the first support and the second support, wherein preferably said damping material is arranged at an axial end section of the inner member, wherein preferably at least part of an inner space of the outer shell is filled with a fluid, e.g. a gas or gas mixture. Alternatively or additionally at least part of said inner space may be a vacuum.

In this way, the damping material can be arranged in an area with relatively large vibratory displacements between the outer shell and the inner member, resulting in improved vibration absorption.

Preferably, at least one of the inner member and the outer shell is provided with a surface enhancing structure, for example one or more recesses and/or protrusions, e.g. fins, which are in contact with the damping material, wherein said recesses and/or protrusions preferably extend substantially laterally or radially with respect to the main load bearing axis.

Such a surface enhancing structure can provide an increased contact surface area with the damping material, thus providing increased shear force on the damping material.

In particular, the inner member and the outer shell can each be provided with respective surface enhancing structures, e.g. mating recesses and/or protrusions. Preferably, the respective surface enhancing structures of the inner member extend radially or laterally outward from the main load bearing axis and the respective surface enhancing structures of the outer shell extend radially or laterally inwardly towards the main load bearing axis, in particular between the surface enhancing structures of the inner member. Preferably, viewed in a transversal plane, the surface enhancing structures of the inner member and the surface enhancing structures of the outer shell are interdigitatingly arranged around the main load bearing axis.

In this way, damping material can be effectively constrained and loaded between the outer shell and the inner member, in particular in a compact way, wherein relatively large contact surface areas of the damping material can be provided in a relatively small space.

A compliance (e.g. axial compliance) of the outer shell may be substantially different from, preferably larger than, a compliance (e.g. axial compliance) of the inner member, in particular under vibratory loads.

Such a design can enable effective shear loading of the damping material under vibratory (e.g. axial) loads.

Alternatively or additionally, a compliance of the outer shell may be substantially different from, preferably smaller than, a compliance of a combination of the inner member and the damping material, in particular in absence of vibratory loads.

Such a design can inhibit hysteresis and enable good dimensional stability, in particular substantially irrespective of gradual deformation, such as creep, in the damping material.

The outer shell may comprise a more compliant section and a less compliant section which sections are (e.g. axially adjacent to each other. Preferably, the (e.g. axial) strength of the more compliant section is substantially equal to or exceeds the (e.g. axial) strength of the less compliant section. The more compliant section may comprise a flexure, for example an array of flexures.

In this way, the more compliant section can provide that the overall compliance of the outer shell is larger than the compliance of the inner member, while the less compliant section can provide a stable interface for the damping material, for example.

The damping material may be arranged at an (e.g. axial) end section of the inner member, wherein the end section of the inner member (e.g. axially) substantially coincides with the (e.g. axially) less compliant section of the outer shell.

Thus, the damping material can be arranged in an area where it can receive relatively large shear forces.

The outer shell and the inner member are preferably made of substantially the same material, in particular a metal or a metal alloy, preferably comprising titanium, stainless steel and/or aluminium.

In this way the device can be particularly stable and durable under challenging conditions such as launch and spaceflight, and/or for a large number of vibration cycles such as on a lithographic apparatus, e.g. a wafer stepper.

The damping material can be a rubber material, in particular a vulcanized rubber material, for example Isoloss®, Smactane®, Sorbothane® and/or SCVBR®.

Such a material can provide above-described features regarding the damping material.

The device may include a layer of damping material (the layer in particular being constrained between an inner surface of the outer shell and an outer surface of the inner member). The layer preferably has a layer thickness relative to an axial length of the outer shell in the range of 0.1% to 10%, more preferably in the range of 0.5% to 5%, more preferably in the range of 1% to 3%, for example about 2%. Alternatively or additionally the layer may have a layer thickness smaller than 5 mm, for example a thickness in the range of 0.1-2 mm. Alternatively or additionally, measured in a plane transversal to the main load bearing axis, the layer may have a layer cross-sectional surface area relative to a total device cross-sectional surface area in the range of 10% to 50%, preferably in the range of 25% to 35%, for example about 30%.

Particularly good damping of vibrations in combination with stable positioning can be provided in this way.

A further aspect of the invention provides an assembly comprising one or more devices as described above and a carrier and/or a load, wherein the respective first and/or second support of the or each device is fixed to the carrier and/or to the load.

Such an assembly can provide above-mentioned advantages.

The assembly is preferably configured to form a substantially statically determinate structure, wherein in particular the load is statically determinately mounted to the carrier. The load may comprise an optomechanical instrument. The carrier may comprise or be attached to a vehicle, e.g. a spacecraft, or a wafer stepper. The present invention can find particular benefit in such an assembly.

Preferably, the number of devices of the one or more devices is at least three, for example six.

The respective main load bearing axis of each of the at least three devices is preferably oriented differently compared to the other devices of the at least three devices.

In this way, for example, one device can be provided for each degree of freedom.

The main load bearing axes (A) of the devices may be oriented to intersect one or more rotational axes of the load and/or a center of gravity of the load. A substantially statically determinate structure can be formed in this way.

A further aspect of the invention provides a vehicle, in particular a spacecraft, comprising an assembly as described above, wherein the carrier is attached to the vehicle or forms part thereof. Preferably, the vehicle is configured to cooperate with a launcher.

Such a vehicle can provide above-mentioned advantages, wherein an instrument as a load can be safely and reliably transported to space and wherein said instrument can be precisely positioned e.g. with respect to the carrier.

A further aspect of the invention provides a method of mounting a load to a carrier. The method of mounting comprises: providing a device as described above; fixing the load and one of the first support and the second support of the device to each other; and fixing the carrier and the other of the first support and the second support of the device to each other.

Such a method can provide above-mentioned advantages.

A further aspect of the invention provides a method of producing a device as described above. This method of producing comprises providing a mold configured to be at least part of the outer shell and providing at least part of the inner member in the mold. This method of producing further comprises supplying a substantially liquid damping material in the mold and at least partially, preferably substantially, solidifying the supplied damping material in the mold, thereby preferably bonding the damping material to the inner member and to the mold (i.e. the damping material can adhere to both the inner member and the mold). It will be appreciated that alternatively or additionally a bonding agent, e.g. an adhesive, which is different from the damping material may be used for bonding the damping material to the inner member and/or to the mold.

A device according to an aspect of the invention can thus be produced reliably and relatively easily, wherein the damping material can be supplied relatively easily in a (more) liquid form and wherein the damping material can subsequently be reliably bonded in place, thus ensuring a good connection and preventing subsequent displacement, e.g. flowing away, of the material.

The at least partial solidifying may comprise vulcanization, wherein in particular the damping material is a rubber material.

Good damping properties of the material can be obtained in this way with good adhesion of the material to the outer shell and to the inner member.

Before the supplying, the at least part of the inner member may be fixed to the mold, e.g. both forming part of a same monolithic structure. The method further optionally comprises separating the at least part of the inner member from the mold, e.g. by removing a connecting part of the monolithic structure.

Precise and stable position of the inner member with respect to e.g. the outer shell can thus be realized, as well as precise dimensioning of the damping material, e.g. of a layer thickness thereof.

At least one of the first support, the second support, the outer shell and the inner member can be produced using additive manufacturing, in particular from a metal or metal alloy, for example comprising titanium, stainless steel and/or aluminium.

The devices can thus be produced with good precision, for example with dimensions customized to the relevant load and/or carrier.

In the following, the invention will be explained further using exemplary embodiments and drawings. The drawings are schematic. In the drawings, similar or corresponding elements have been provided with similar or corresponding reference signs. In the drawings:

FIG. 3b shows a longitudinal cross section view of the first preform of FIG. 3a;

FIG. 4a shows an isometric view of a second monolithic preform for the fourth exemplary device of FIG. 3a;

FIG. 4b shows a longitudinal cross section view of the second preform of FIG. 4a;

Figures 1, 2A, 2B:
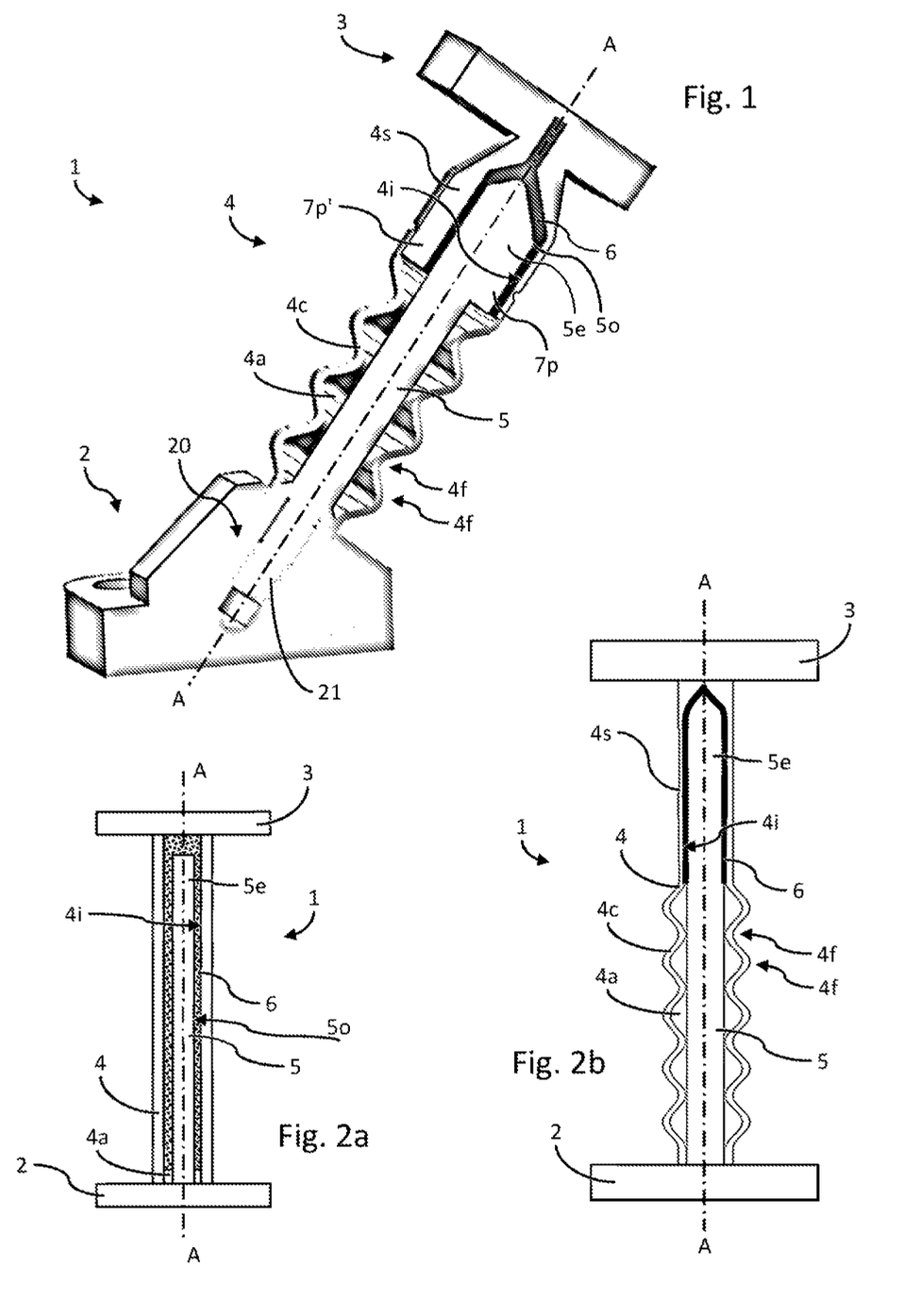
FIG. 1 shows a partially opened perspective view of a first exemplary device for mounting a load to a carrier.
FIG. 2a shows a longitudinal cross section view of a second exemplary device for mounting a load to a carrier.
FIG. 2b shows a longitudinal cross section view of a third exemplary device for mounting a load to a carrier.
Figure 5:
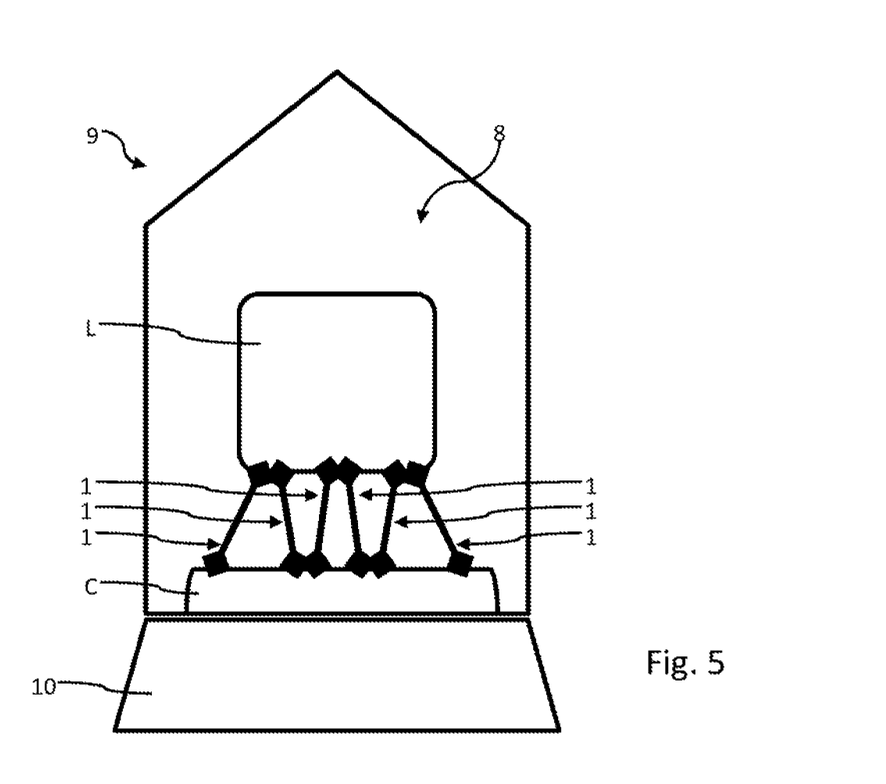
FIG. 5 shows an exemplary vehicle with an exemplary assembly.
Figure 6A:
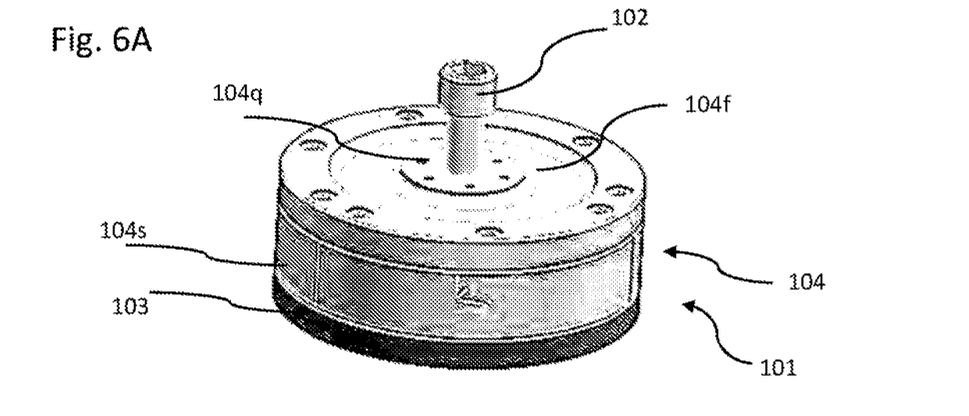
FIG. 6A shows a perspective view of a further embodiment of a device for mounting a load to a carrier.
Figure 6B:
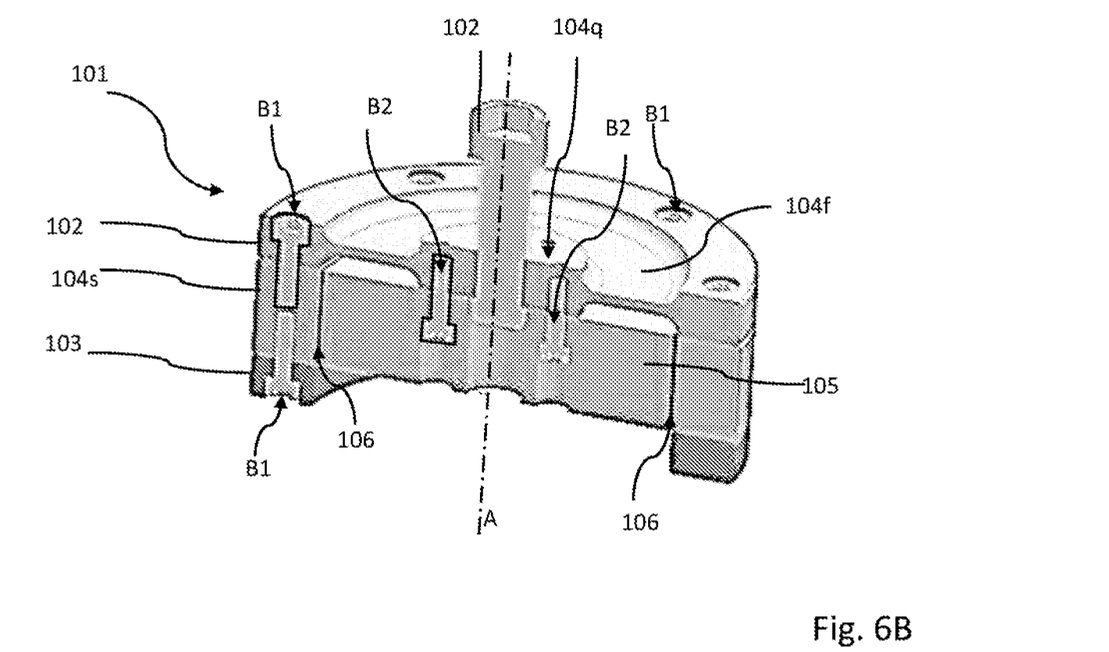
FIG. 6B shows a longitudinal cross-section of the embodiment of FIG. 6A.
Figure 7A:
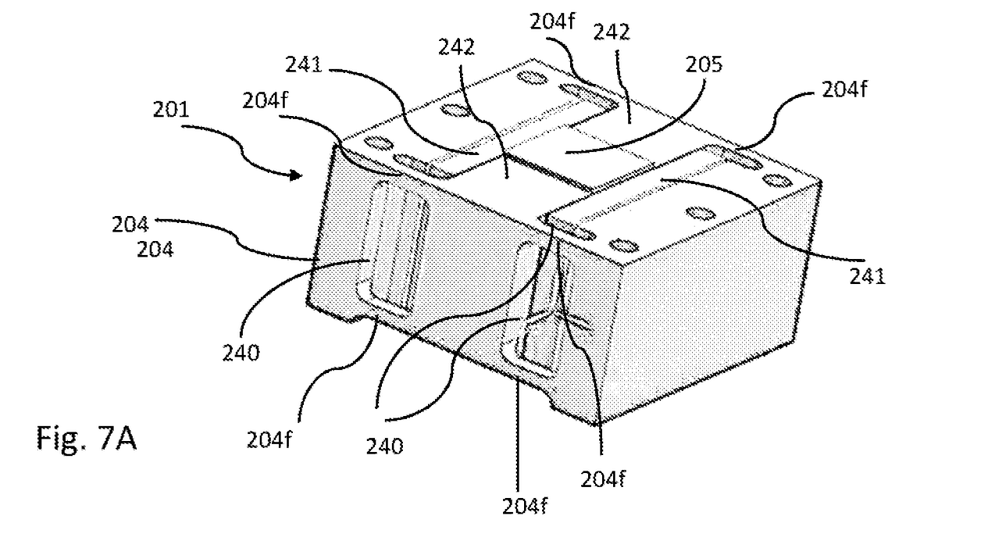
FIG. 7A shows a perspective view of part of a yet another embodiment of a device for mounting a load to a carrier.
Figure 7B:
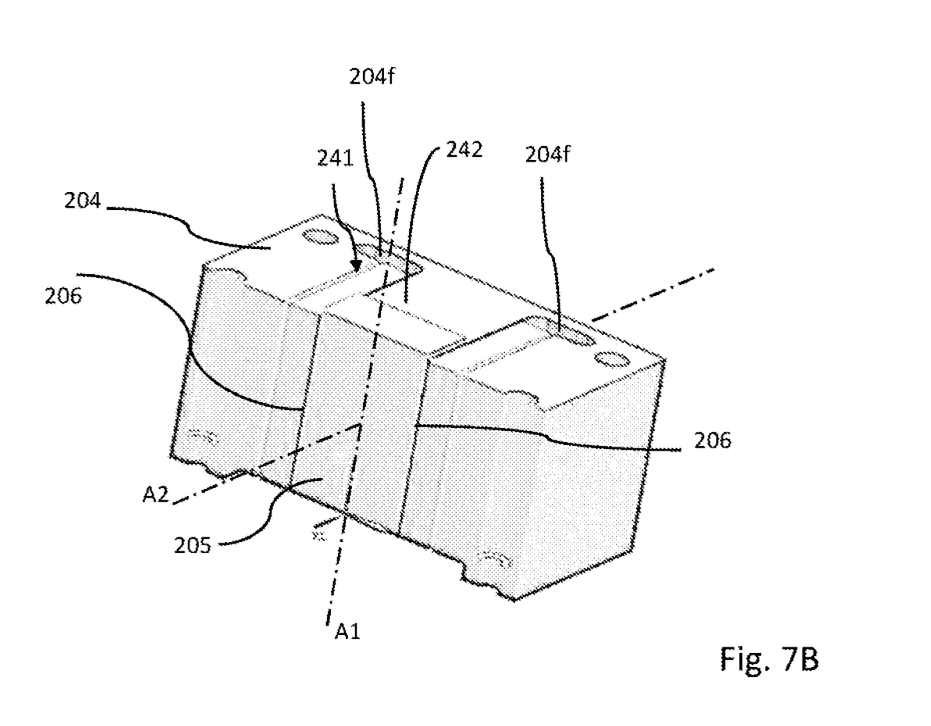
FIG. 7B shows a opened-up view of the embodiment of FIG. 7A.
Figure 8:
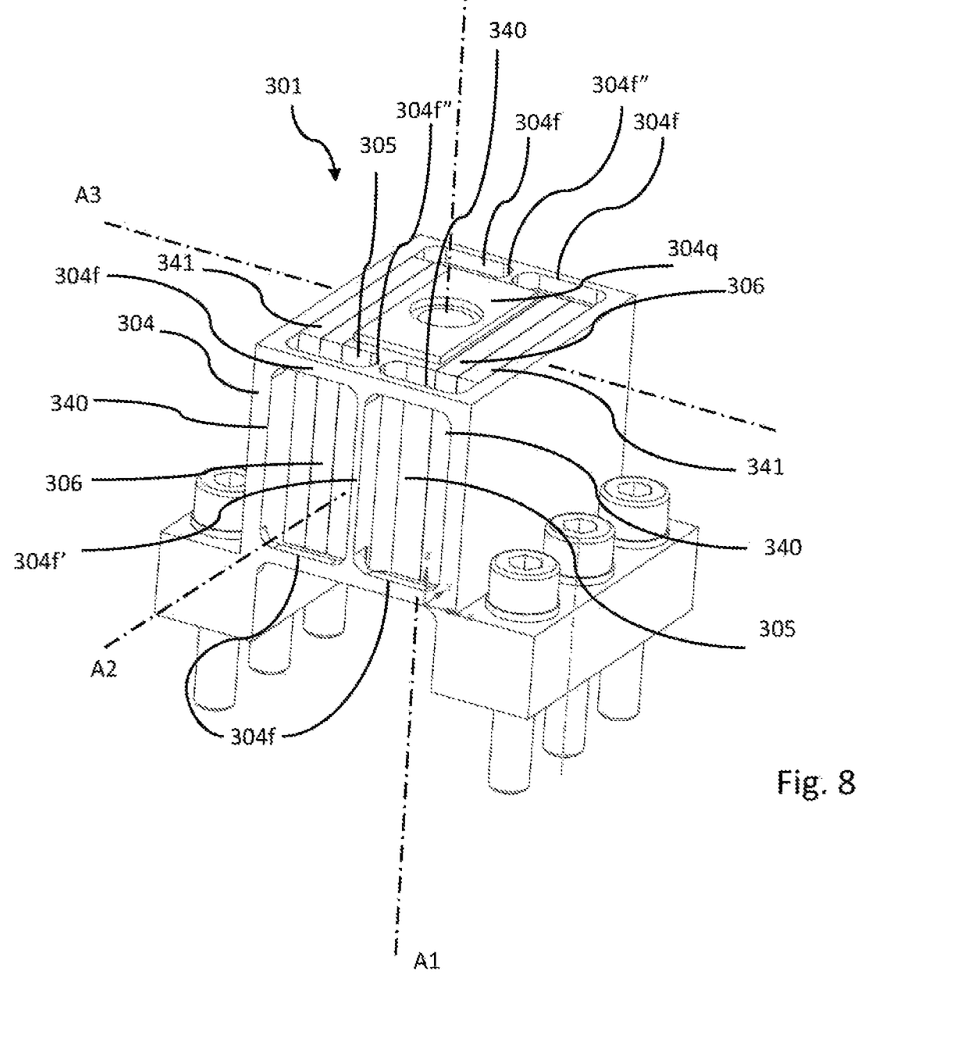
FIG. 8 shows a perspective view of part of a further embodiment of a device for mounting a load to a carrier.

FIGS. 1, 2a and 2b each show a device 1 for mounting a load L to a carrier C. FIG. 5 shows an assembly 8 comprising six of such devices 1 each being connected to a load L and a carrier C. Further examples are depicted in FIGS. 6-8.

The device 1 comprises a first support 2 configured for fixation to the carrier C and a second support 3 configured for fixation to the load L. The first and second supports 2, 3 are spaced away from each other viewed along a main load bearing axis A of the device 1. The device 1 comprises an outer shell 4 extending along the main load bearing axis A, said outer shell 4 connecting the first support 2 and the second support 3 to each other. It follows that the outer shell 4 can provide a direct load path between the first support 2 and the second support 3. The outer shell 4 can be fixed directly to each of the supports 2, 3 (as in the depicted examples), for example via bolting connections, welding connections and/or be integrated with one or both of the supports 2, 3.

The outer shell 4 as such can be configured in various ways as will be appreciated by the skilled person (as follows from the various non-limiting embodiments that are disclosed). In particular, the outer shell 4 (which can also be called e.g. an outer member, outer wall, outer structure or outer element) can be configured to define or surround an inner space.

The device 1 comprises an inner member 5, preferably extending along the main load bearing axis A, within the outer shell 4 (i.e. within an inner space of the outer shell 4). The inner member 5 as such can also be configured in various ways as will be appreciated by the skilled person (as follows from the various embodiments that are disclosed). In particular, the inner member 5 (which can also be called e.g. an inner element, inner structure, inner wall, or damping material support) can be configured to be received within the outer shell 4.

The device 1 comprises a damping material 6 connecting the inner member 5 to at least the outer shell 4, for example directly (as in the present embodiment) and/or via one or both of the first support 2 and the second support 3. It is preferred that the damping material 6 is constrained between an inner surface 4i the outer shell 4 and an opposite outer surface 5o of the inner member 5 (see e.g. FIGS. 1a, 1b, 2). In particular, the damping material 6 connects to the outer shell 4 as well as to the inner member 5, preferably such that axial displacement of the inner member 5 with respect to the outer shell 4 (i.e. along a load bearing axis) leads to shearing of the damping material 6, wherein kinetic energy is converted to heat, so that part of the vibrations are thereby absorbed. As is mentioned before, this approach is known as constrained (layer) damping, opposed to vibration isolation. For example, the damping material 6 can (at least partly) fill an interior space or slit that can be present between the outer shell 5 and the inner member 4.

As shown in the examples of FIGS. 1, 2a and 2b, the damping material 6 preferably connects to an inner surface 4i of the outer shell 4. Such a connection is preferably provided by an adhesive property of the damping material 6 itself. To that end, the damping material 6 can be a curable material which can adhere (e.g. bond) to another material (i.e. the inner surface 4i and preferably a surface 5o of the inner member 5) upon curing of the damping material 6. The damping material 6 can thus (directly) connect to the inner surface 4i of the outer shell as well as to the inner member 5, preferably substantially continuously along each respective surface, resulting in a good transfer of mechanical energy from said surfaces to the damping material 6 as well as preferably good heat dissipation from the damping material 6 to the environment via said surfaces.

The outer shell 4 and the inner member 5 are shown can be arranged substantially in parallel, and in parallel with (and e.g. concentric with respect to) the main load bearing axis A. For example the outer shell 4 and inner member 5 can have respective opposite contact surfaces 4i, 5o that surround the damping material (and connect to the damping material) 6, which contact surfaces 4i, 5o can extend in parallel with parallel with (and e.g. concentric with respect to) the main load bearing axis A It follows that, similarly, the damping material (e.g. damping layer) 7 as such preferably extends in parallel with the main load bearing axis A. The same can hold for an interior space (or slit) between the outer shell 4 and inner member 5 that is filled with the damping material 7.

In the examples, the inner member 5 is spaced away from the second support 3 (i.e. it is not fixed to the second support 3), wherein the inner member 5 is fixed, in particular directly, to the first support 2. It follows that, in that case, the inner member 5 does not provide a direct load path between the first support 2 and the second support 3. The inner member 5 can be fixed directly the first support 2 (as in the depicted examples), for example via bolting connections, welding connections and/or be integrated with the support 2.

It will be appreciated that alternatively the inner member 5 may be spaced away from the first support 2 and fixed (directly) to the second support 3, for example.

As shown, the damping material 6 is spaced away from the first support 2, said material 6 being arranged at an axial end section 5e of the inner member 5. At least part of an inner space 4a of the outer shell 4 can be filled with a fluid, e.g. a gas or gas mixture, in particular a part that is not occupied by the damping material 6. Alternatively or additionally at least part of said inner space 4a can be a vacuum. It follows that preferably, the damping material 6 covers only part of the outer surface of the inner member 5.

Optionally (not shown) the damping material 6 is substantially confined to one or more spaces where respective contact surface areas of the outer shell 4 and the inner member 5 extend substantially in parallel with the main load bearing axis A of the device 1. It has been found that damping behavior can thus be further enhanced. To realize such confinement, part of the damping material may be removed, in particular a part or parts outside said one or more spaces. Such removal may be carried out after solidification, e.g. by post-machining, wherein e.g. one or more other parts of the device 1, such as a sprue 11s (see below), are removed at the same time.

Figure 4A:
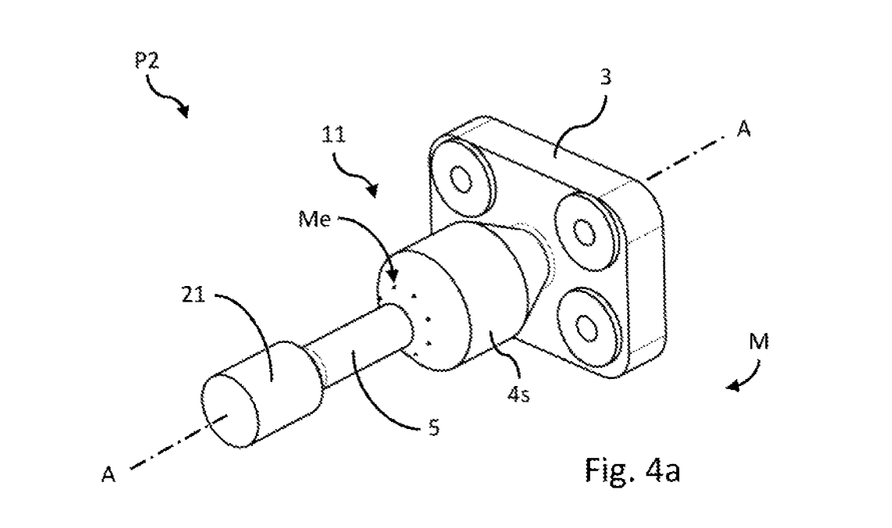
Figure 4B:
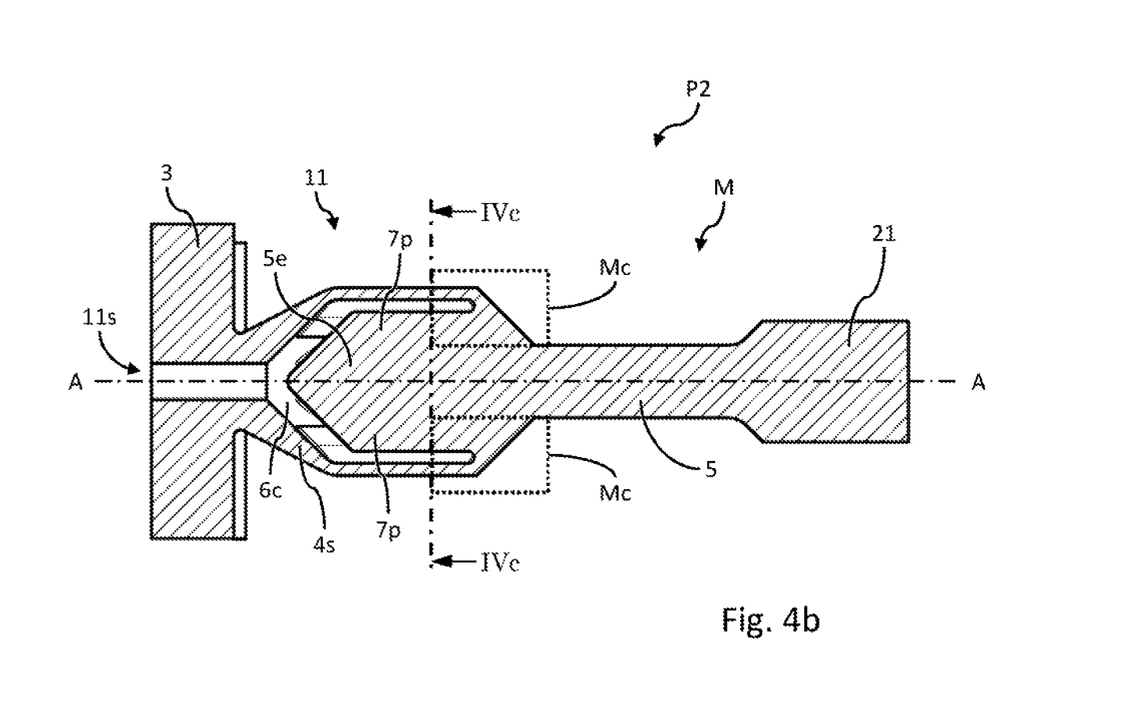
Figure 4C:
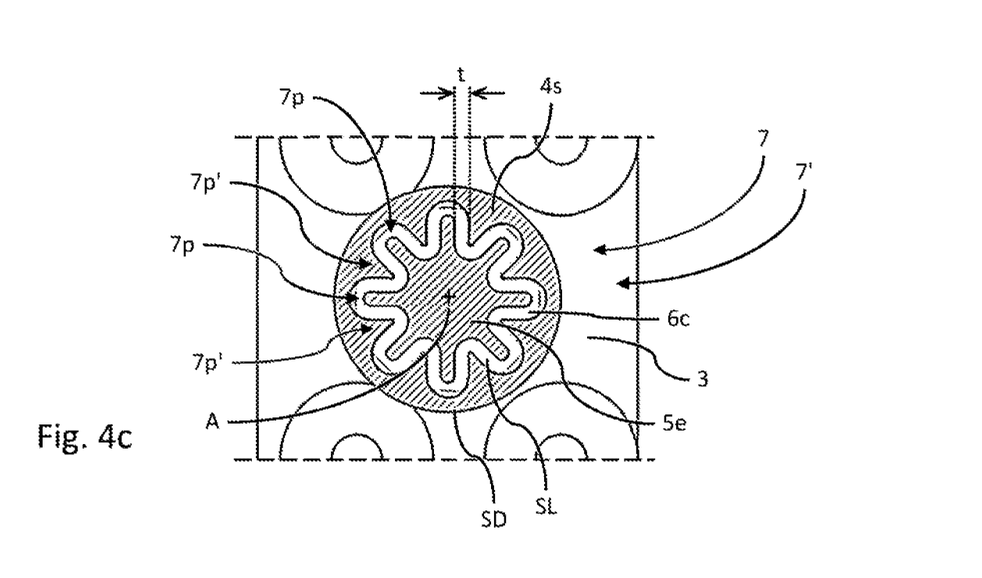
FIG. 4c shows a transversal cross section view of the second preform along the line IVc-IVc in FIG. 4b.

With particular reference to FIG. 4c, i.e. in particular viewed in a lateral cross-section of the device 1, the inner member 5 and the outer shell 4 are preferably each provided with a surface enhancing structure 7, 7', in this case mating protrusions 7p, 7p', e.g. fins, which are in contact with the damping material 6. The shown protrusions 7p, 7p' extend substantially laterally or radially with respect to the main load bearing axis A. Respective recesses can be seen between each neighboring pair of protrusions 7p, as well as between each neighboring pair of protrusions 7p'. Alternatively, only one of the inner member 5 and the outer shell 4 is provided with a surface enhancing structure, for example.

As shown in FIG. 4c, the respective surface enhancing structures 7 of the inner member 5 can extend radially outward from the main load bearing axis A and the respective surface enhancing structures 7' of the outer shell 4 extend radially inwardly towards the main load bearing axis A, in particular between the surface enhancing structures 7 of the inner member 5.

Viewed in a transversal plane, as in FIG. 4c, the surface enhancing structures 7 of the inner member 5 and the surface enhancing structures 7' of the outer shell 4 can be interdigitatingly arranged around the main load bearing axis A. As shown, each protrusion 7p is thus arranged between neighboring protrusions 7p' (substantially in a recess formed therebetween), and similarly each protrusion 7p' is arranged between neighboring protrusions 7p (substantially in a recess formed therebetween).

With further reference to the examples of FIGS. 1 and 2b, the device can be configured such that an axial compliance of the outer shell 4 is larger than an axial compliance of the inner member 5, in particular under vibratory loads. In this context, an axial compliance can be understood as a compliance under axial loads, i.e. loads which are directed substantially along the main load bearing axis A (see FIGS. 1, 2b).

Meanwhile, in the present configuration, an axial compliance of the outer shell 4 is accordingly smaller than an axial compliance of a combination of the inner member 5 and the damping material 6 in absence of such vibratory loads. In FIGS. 1 and 2b, the outer shell 4 can be seen as comprising a more compliant section 4c and a less compliant section 4s which sections are axially adjacent to each other. By contrast, the example of FIG. 2a does not show such sections. Accordingly, in a basic embodiment, a compliance of the outer shell 4 may be substantially constant throughout the outer shell 4.

It will be appreciated that an axial compliance of the outer shell 4 may be substantially equal to an axial compliance of the inner member 5. It will also be appreciated that such axial compliances and/or such differences may be substantially independent of characteristics of loads, e.g. being substantially equal under vibratory loads compared to non-vibratory loads.

The axial strength of the more compliant section 4c is preferably substantially equal to or exceeds the axial strength of the less compliant section 4s.

In the shown examples (see FIGS. 1 and 2b), the more compliant section 4c can comprise a flexure 4f, in particular an axial array of flexures 4f. Two examples of such flexures 4f have been indicated in each of FIGS. 1, 2b, 3a and 3b. It will be appreciated that the shown structures can be considered to comprise an array of more such flexures 4f, wherein the array forms a combined flexure which is designed for compliance under substantially axial loads.

In an example which is not shown, the inner member 5 can be provided with at least one respective flexure, for example in the form of a circumferential notch, in particular at a distance from the damping material 6, for example adjacent to a connection between the inner member 5 and the first support 2. It has been found that such a flexure of the inner member 5 can advantageously provide increased bending compliance of the inner member, which can promote shearing of the damping material during use, as opposed to compression thereof. Such a configuration can thus make the device's damping performance less dependent on a potentially variable alignment between the load L and the main load bearing axis A.

As previously explained, the damping material 6 is shown to be preferably arranged at an axial end section 5e of the inner member 5. The examples of FIGS. 1 and 2b show that this axial end section 5e of the inner member 5 axially substantially coincides with the axially less compliant section 4s of the outer shell 4. As follows from FIGS. 7-8, the damping material 6 can also be arranged differently.

In the examples, the outer shell 4 and the inner member 5 can be made of substantially the same material, in particular a metal or a metal alloy, preferably comprising titanium, stainless steel and/or aluminium.

The damping material 6 is preferably a rubber material, in particular a vulcanized rubber material, for example Isoloss®, Smactane®, Sorbothane® and/or SCVBR®.

The damping material 6 can be seen as arranged substantially in the form of a layer of said material 6, for example a layer that is arranged in parallel with the main loading axis A. This layer has a layer thickness t for which an example of measurement is indicated in FIG. 4c as a width of a respective cavity 6c in which the layer can be formed.

The layer thickness t can be designed in various ways. First, a layer thickness t can be designed relative to an axial length of the outer shell, wherein the thickness t is in the range of 0.1% to 10%, more preferably in the range of 0.5% to 5%, more preferably in the range of 1% to 3%, for example about 2%. Alternatively or additionally, the layer thickness t can be smaller than 5 mm, for example a thickness in the range of 0.1-2 mm. Alternatively or additionally, the layer thickness t can be designed such that measured in a plane transversal to the main load bearing axis A, a layer cross-sectional surface area SL relative to a total device cross-sectional surface area SD in the range of 10% to 50%, preferably in the range of 25% to 35%, for example about 30%.

FIG. 5 shows an exemplary assembly 8 comprising six devices 1 and a carrier C and a load L. The respective first support 2 of each device 1 is fixed to the carrier C while the respective second support 3 is fixed to the load L. It will be appreciated that alternatively the first support 2 may be fixed to the load L while the second support 3 is fixed to the carrier C.

The assembly 8 can be configured to form a substantially statically determinate structure, wherein in particular the load L is statically determinately mounted to the carrier C. Options for providing such static determinacy as such are known to the skilled person, e.g. in the context of mounting a load to a carrier using traditional struts.

The load L may comprise an optomechanical instrument. The carrier C may comprise or be attached to a vehicle 9, e.g. a spacecraft. Alternatively, the carrier may comprise or be attached to a wafer stepper (not shown), for example, among other options.

As schematically indicated in FIG. 5, the respective main load bearing axis A (see e.g. FIGS. 1, 2a and 2b) of each of the six devices 1 is oriented differently compared to the other of the six devices 1. It will be appreciated that in this context, oriented differently refers to three-dimensional orientation. Thus, while the respective axes A of two devices 1 may be substantially parallel in two dimensions, they are then preferably aligned differently (not parallel) in the third dimension. As will be appreciated by the skilled person, the main load bearing axes A can thus be oriented to intersect one or more rotational axes of the load L and/or a center of gravity of the load L.

FIG. 5 also shows an example of a vehicle 9, in particular a spacecraft, comprising the assembly 8, wherein the carrier C is attached to the vehicle 9 or forms part thereof. The exemplary vehicle 9 is configured to cooperate with a launcher 10.

With continued reference to FIG. 5, an exemplary method of mounting a load L to a carrier C, comprises: providing a device 1; fixing the load L and one of the first support 2 and the second support 3 of the device 1 to each other; and fixing the carrier C and the other of the first support 2 and the second support 3 of the device 1 to each other. As explained above and shown in FIG. 5, preferably six devices are thus used, wherein the main axis A of each device is preferably oriented differently.

Figure 3A:
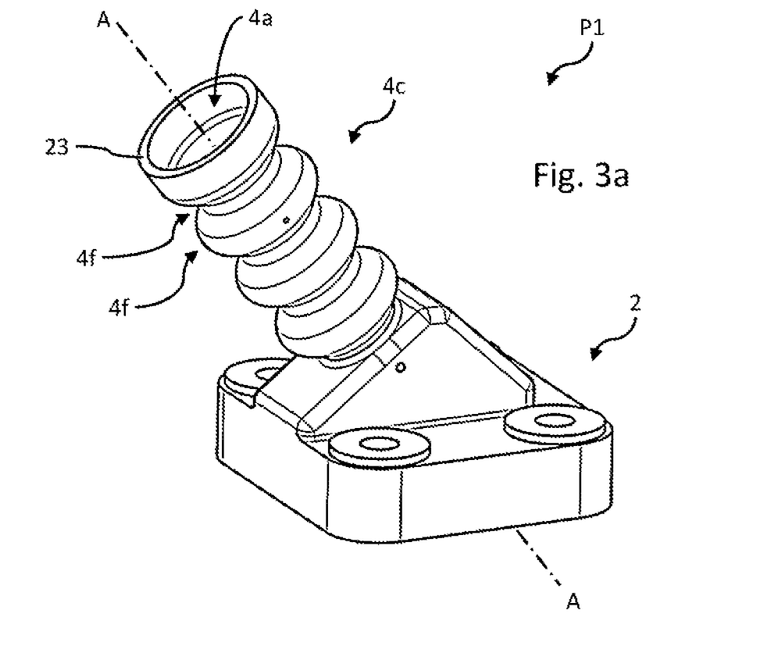
FIG. 3a shows an isometric view of a first monolithic preform for a fourth exemplary device for mounting a load to a carrier.
Figure 3B:
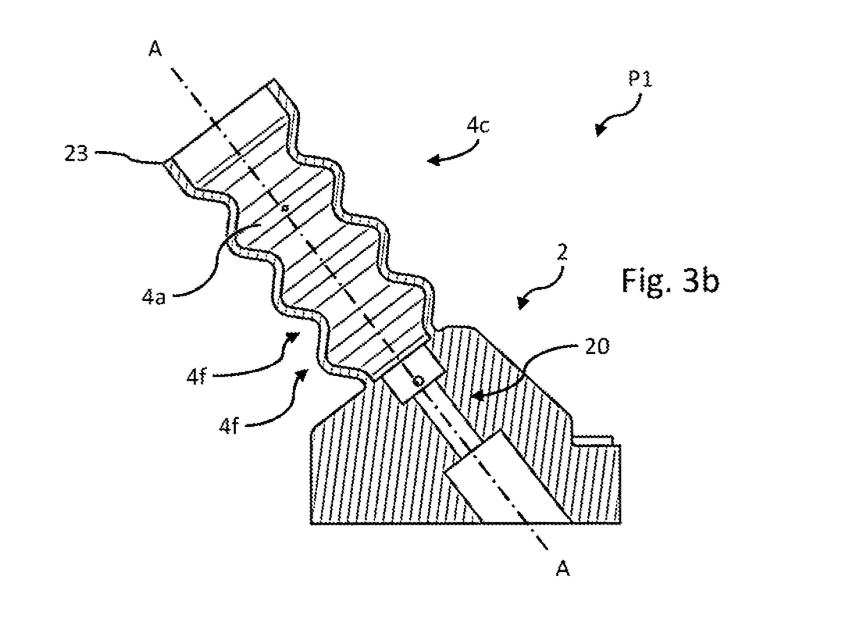

FIGS. 3a, 3b, 4a, 4b and 4c illustrate a method of producing an exemplary device 1, wherein FIGS. 3a and 3b show a first monolithic preform P1 for a device 1 and FIGS. 4a, 4b and 4c show a second monolithic preform P2 for the device 1, the first and second monolithic preform being usable together in a method of producing an exemplary device 1.

The method of producing comprises providing a mold 11 (see FIGS. 4a, 4b) configured to be at least part 4s of the outer shell 4. In the example, the mold 11 is part of the second monolithic preform P2. The method comprises providing at least part of the inner member 5 in the mold 11, for example as part of the same second monolithic preform P2.

The method comprises supplying a substantially liquid damping material 6, in particular a curable and/or settable material, in the mold 11. To that end, the mold 11 is shown to provide a respective cavity 6c (see FIGS. 4b, 4c) in which the damping material can be received 6 and solidified. The cavity 6c is therefore dimensioned according to the design of the eventually solidified damping material 6, e.g. to form a layer of said material, see e.g. a layer thickness t indicated in FIG. 4c. A sprue 11s is shown in FIG. 4b for supplying the liquid material into the cavity 6c. The sprue 11s can be closed off, e.g. using a plug (not shown), after supplying the damping material 6 in the cavity 6c. Alternatively or additionally (not shown), the sprue 11s can be partially or entirely removed after such supplying, e.g. removed by machining.

As shown in FIG. 4a, the mold 11 may be provided with one or more air exit openings Me which allow air to escape from the cavity 6c when the damping material is supplied therein.

The method comprises at least partially, preferably substantially, solidifying, e.g. curing and/or setting, the supplied damping material 6 in the mold 11, thereby preferably bonding (i.e. adhesing) the damping material 6 to the inner member 5 and to the mold 11.

The at least partial solidifying preferably comprises vulcanization, wherein in particular the damping material 6 is a rubber material.

Before the supplying, and possibly thereafter, the at least part of the inner member 5 is fixed to the mold 11, e.g. both forming part of a same monolithic structure M, as shown in FIG. 4b, for example.

The at least part of the inner member 5 can subsequently be separated from the mold 11 by removing a connecting part Mc (see FIG. 4b) of the monolithic structure M. The above-mentioned air exit openings Me may extend substantially in, and thus be removed together with, said connecting part Mc. After such separation, the inner member 5 can remain connected to the mold 11 via the solidified damping material 6, e.g. to a part 4s of the mold 11 which can form part of the outer shell 4.

In the example, an axial connecting end 21 of the inner member 5 can subsequently be fixed, e.g. screwed, to a respective receiving structure 20 of the first monolithic preform P1. To that end, one or both of said connecting end 21 and receiving structure 20 may be provided with a respective threaded structure, e.g. formed by machining. Alternatively or additionally one or more separate bolts may be used, among other options. In a particularly advantageous alternative, a single bolt or the-like may be used to fix the carrier C (or the load L) both to the first support 2 and to the inner member 5, such that the inner member 5 is thus fixed to the first support 2 via said a single bolt which also connects the device 1 to the carrier C or the load L.

Thereafter, an axial end 23 of an outer shell part 4c the first monolithic preform P1 can be fixed, e.g. welded, to a respective outer shell part 4s for forming the overall device 1. Either or both of the preforms P1, P2 may be prepared for thus joining them together prior to said joining, in particular by a precision machining step, e.g. by thus providing one or more threaded structures for joining the parts 20 and 21.

The first support 2, the second support 3, the outer shell 4 and the inner member 5 can thus be produced using additive manufacturing, in particular from a metal or metal alloy, e.g. comprising titanium, stainless steel and/or aluminium, in particular additive manufacturing of two corresponding monolithic preforms P1, P2 of which at least one can be used as a mold for providing the damping material, wherein the preforms P1, P2 or respective intermediate products are subsequently joint together to form the device 1.

It will be appreciated that instead of two separate monolithic preforms P1, P2, a single combined monolithic preform (not shown) can be used. Such a single preform may provide a combination of the structures of separate preforms P1, P2, for example. With reference to FIGS. 1 and 4b, such a single preform may include a cavity which corresponds to cavity 6c in FIG. 4b. In that case the single preform preferably includes a suitable obstruction to prevent flowable damping material from entering a space which corresponds to the inner space 4a in FIG. 1. Such an obstruction can subsequently be removed, e.g. by machining or otherwise, after solidification of the damping material.

Thus there is provided an improved device and method for mounting a load to a carrier, which device can be advantageously produced as described above. As will be clear to the skilled person, the device can additionally or alternatively be produced using one or more different methods, for example without additive manufacturing, for example using one or more (additional) molding processes and/or using a milling process.

FIGS. 6A, 6B depict another non-limiting example of a device 101 for mounting a load L to a carrier C, in particular configured to utilize constrained layer damping.

An outer shell 104 is fixed to each of the supports 102, 103, e.g. via respective bolting connections B1, adhesive, welding or the-like. An inner member 105 is fixed to one of the supports 102, e.g. via second bolting connections B2 (and/or welding and/or adhesive), but not to the other support 103.

For example, the inner member 105 can be located centrally within the outer structure (shell) 104 (but that is not required). Optionally, the outer shell 104 can include a cylindrical shell section 4s (e.g. having a circle-cylindrical shape). Also, optionally, the inner member 104 can be a cylindrical structure (e.g. having a circle-cylindrical shape).

In this example, the outer shell can include a radially inward extending, e.g. disc shaped, flexural section 104*f*, that can be connected to the first support 102, e.g. via a central section 104*q* of the outer shell (the central section 104*q* being located within the flexural section 104*f*). Also, for example, the outer shell 104 can be connected to the inner member 105 on the inside only (e.g. via bolting means B2 and respective central section 104*q* of the outer shell 104).

An outer rim of flexural section 104*f* can e.g. be connected to the outer shell 104 (similar in function as the less compliant section 4*s* of the example in FIGS. 1-4).

For example, opposite surfaces of the shell section 104*s* of the outer shell 104 and inner member 105 can define a slit or inner space that is (partly or entirely) filled with the damping material 106, which material can be fixed/bonded to each of those opposite surfaces. In this way, above-mentioned advantages can be achieved.

FIGS. 7A, 7B show part of another example 201, which differs from the embodiment of FIGS. 6A, 6B in that instead of one load bearing axis, this device has two: A1 and A2, in particular provided by means of a combination of flexible elements or sections, in this case beam-like structures 204*f* made by providing apertures into the outer shell 204. Therefore less devices are needed in configuration and for some cases it results in better system performance or easier implementation.

For example, the outer shell 204 can be a block-shaped structure that encloses an inner space for receiving further integral shell sections 241 (two in this example), of each which is provided with (a layer) of damping material 206. Each of the damping material layers 206 is fixed (bonded) to the outer shell 204, at least to those shell sections 241 of the outer shell 204. Also, the an inner member 205 is received within the outer shell, between the one or more integral sections 241, wherein the inner member 205 is bonded to the one or more sections 241 of the outer shell 204 via the one or more damping material layers 206.

Furthermore, the outer shell 204 (e.g. its integral shell sections 241) can be connected to the inner member 205 e.g. by adhesive or bolted connections (not shown), similar to above embodiments.

For example, opposite walls of the outer shell can include one or more apertures 240 to define flexural beam-like structures 204*f* of the outer shell. In the present example, the flexural beams 204*f* extend normally with respect to a plane defined by two orthogonal loading axes A1, A2 of the present example. These beam-like structures 204*f* (or "flexural beams") can be similar in function as the flexural membrane section 104*f* of the example in FIGS. 6A, 6B and flexural part 4*s* of the embodiments of FIG. 1-4, providing improved device performance. Due to its configuration, a relatively small number of these devices 201 can be applied to restrict/limit the number of degrees of freedom of a load.

A first support configured for fixation to the carrier C and a second support configured for fixation to the load L, are not depicted in FIGS. 7A, 7B. After assembly, the outer shell 204 can be connected e.g. to either the first support or to the second support (as e.g. in the above examples), in particular to provide a direct load path there-between (via respective integral flexural sections 204*f*), wherein the inner member 205 can be fixed to only one of the first support and the second support, so that above-mentioned advantages can be achieved.

The inner member 205 can have an angular cross-section (e.g. rectangular or square) but that is not required. For example, during vibrational loads the inner member 205 can slide within the outer shell 204 in directions (i.e. along axes) A1, A2 and combinations thereof, the outer shell 204 e.g. having the one or more flexures 204*f* that can constrain the movement and can instantiate proper shear loading of the damping material 206. Besides, it follows that constrained layer damping can be achieved in two orthogonal directions A1, A2, a second orthogonal direction being orthogonal with respect to a main load bearing direction.

In particular it follows that the device can be configured to provide at least a main loading axis A1 and at least an additional second loading axis A2 that is orthogonal with respect to the main loading axis A1. For example, an inner surface of the outer shell 204 and an opposite outer surface of the inner member 205 (the surfaces being connected by respective preferably damping material 206) can both extend along a plane that is in parallel with respect to a plane defined by main loading axis and the additional second loading axis A2 (the same holds for the damping material 206 that is located between those surfaces).

It also follows that the outer shell 204 can include a relatively thin region 204*f*, or membrane flexure, similar in function as flexure 4*f* of the example in FIGS. 1-4, providing above-mentioned advantages FIG. 8 show part of another example 301, which differs from the embodiment of FIGS. 7A, 7B in that additional flexible elements (in this case integral flexural beam sections) 304*f*, 304*f*, 304*f'* have been included in the outer shell (via respective apertures 340 in respective shell walls) Also, relatively thick damping material pads 306 are provided along integral shell sections 341 (two in this example). Each of the damping material pads 306 can e.g. be fixed (bonded) to the outer shell 304, at least to those shell sections 341. The damping material pads preferably extend in directions of movement (e.g. in parallel with the plane constructed by extension of axes A1 and A2).

In particular, a number of integral flexural sections 304*f* of the shell can extend normally with respect to a first plane that is defined by two orthogonal loading axes A1, A2 of the present example. Further integral flexural sections 304*f* can extend e.g. in parallel with a first loading axis A1. For example, in each of two opposite side walls of the outer shell, a plurality of the integral flexural beam sections 304*f*, 304*f* can define an H-shaped flexural structure (as in FIG. 8). Also, for example, a number of integral flexural sections 304*f'* can extend e.g. in parallel with a second loading axis A2, towards a central section 304*q* of the outer shell 304*q*.

It follows that the outer shell 304 can include multiple apertures 340 for establishing/defining integral flexural elements 304*f*, 304*f*, 304*f'* e.g. to guide movements and instantiate shear loading on the viscoelastic material for vibration loads, preferably in three orthogonal directions (i.e. along respective axes) A1, A2 and A3. In this example, preferably, movement of a load or base in the depicted A3 direction (i.e. along the A3 axis) can lead to rotation around the A2 axis (because of the integral flexible shell elements). As in above examples, the outer shell 304 can include an inner member 305 which can be bonded to the one or more sections 341 of the outer shell 304 via the one or more damping material layers 306. Thus, since additional flexible shell elements 304*f*, 304*f*, 304*f'* are applied, respective damping can be achieved in three orthogonal directions (i.e. along respective axis) A1, A2, A3, a third orthogonal direction being orthogonal with respect to the other bearing directions A1, A2.

In an embodiment, the damping can e.g. result from translation related and/or tilting related vibration or movement of the outer shell with respect to the inner member. Referring to FIG. 8, as an example, external force applied to the system/device in a direction parallel with the A3 axis can lead to a tilting of the outer shell and respective internal inner member (the A2 axis e.g. being a tilting axis or being in parallel with the tilting axis), thereby shearing the intermediate damping material pads.

While the invention has been explained using exemplary embodiments and drawings, these do not limit the scope of the invention in any way, said scope being provided by the claims. It will be appreciated that many variations, alternatives and extensions are possible within said scope, as will be clear to the skilled person from the description and the drawings. A different number than six devices may be used for mounting a load to a carrier. An assembly comprising a device may be arranged in or on a vehicle without a launcher or on a different structure, e.g. in or on a building.

The invention claimed is:

1. A device for mounting a load to a carrier and configured to utilize constrained layer damping, the device comprising:
   a first support configured for fixation to the carrier;
   a second support configured for fixation to the load, wherein the first support and the second support are spaced away from each other viewed along a main load bearing axis of the device;
   an outer shell extending along the main load bearing axis;
   an inner member within the outer shell; and
   a damping material connecting the inner member to at least the outer shell,
   wherein the outer shell directly connects the first support and the second support to each other and thus provides a direct load path between the first support and the second support.

2. The device according to claim 1, wherein the damping material connects to an inner surface of the outer shell.

3. The device according to claim 1, wherein the outer shell and the inner member are arranged substantially in parallel.

4. The device according to claim 1, wherein the inner member is spaced away from one of the first support and the second support, wherein the inner member is fixed to the other of the first support and the second support, wherein the outer shell connects the first support and the second support to each other.

5. The device according to claim 1, wherein the damping material is spaced away from one of the first support and the second support.

6. The device according to claim 1, wherein at least one of the inner member and the outer shell is provided with a surface enhancing structure.

7. The device according to claim 1, wherein the inner member and the outer shell are each provided with respective surface enhancing structures.

8. The device according to claim 1, wherein a compliance of the outer shell is substantially different from a compliance of the inner member, in particular under vibratory loads.

9. The device according to claim 1, wherein the outer shell comprises a more compliant section and a less compliant section that are adjacent to each other.

10. The device according to claim 9, wherein the damping material is arranged at an end section of the inner member, wherein the end section of the inner member substantially coincides with the less compliant section of the outer shell.

11. The device according to claim 1, wherein the outer shell and the inner member are made of substantially a same material.

12. The device according to claim 1, wherein the damping material is a rubber material.

13. The device according to claim 1, including a layer of damping material, wherein the layer of damping material has at least one property taken from the group consisting of:
   a layer thickness relative to an axial length of the outer shell in the range of 0.1% to 10%;
   a layer thickness smaller than 5 mm; and
   measured in a plane transversal to the main load bearing axis, a layer cross-sectional surface area relative to a total device cross-sectional surface area in the range of 10% to 50%.

14. The device according to claim 1, wherein the damping material adheres to each of the outer shell and to the inner member.

15. The device according to claim 1, wherein the device is configured to provide at least a main loading axis and at least an additional second loading axis that is orthogonal with respect to the main loading axis.

16. An assembly comprising:
   one or more devices according to claim 1; and
   a carrier and/or a load,
   wherein the respective first support and/or second support of the device or each device is fixed to the carrier and/or to the load.

17. The assembly according to claim 16, wherein the number of devices of the one or more devices is at least three.

18. The assembly according to claim 17, wherein the respective main load bearing axis of each of the at least three devices is oriented differently compared to the other devices of the at least three devices.

19. A vehicle comprising an assembly according to claim 16, wherein the carrier is attached to the vehicle or forms part thereof.

20. A method of mounting a load to a carrier, comprising:
   providing a device according to claim 1;
   fixing the load and one of the first support and the second support of the device to each other; and
   fixing the carrier and the other of the first support and the second support of the device to each other.

* * * * *